United States Patent
Van Belle et al.

(10) Patent No.: US 7,720,917 B2
(45) Date of Patent: May 18, 2010

(54) METHOD AND DEVICE FOR HIDING MESSAGES

(75) Inventors: Theodore Benedict Van Belle, Waterloo (CA); Andrew Douglas Bocking, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 321 days.

(21) Appl. No.: 11/396,716

(22) Filed: Apr. 4, 2006

(65) Prior Publication Data

US 2007/0233793 A1 Oct. 4, 2007

(51) Int. Cl.
G06F 15/16 (2006.01)
G06F 12/00 (2006.01)

(52) U.S. Cl. .................................... 709/206; 709/207
(58) Field of Classification Search ................ 709/206, 709/207, 250; 345/828
See application file for complete search history.

(56) References Cited

U.S. PATENT DOCUMENTS

| | | | | |
|---|---|---|---|---|
| 6,052,709 | A * | 4/2000 | Paul | 709/202 |
| 6,321,257 | B1 * | 11/2001 | Kotola et al. | 709/219 |
| 7,130,885 | B2 | 10/2006 | Chandra et al. | |
| 7,164,697 | B1 * | 1/2007 | Beser | 370/485 |
| 7,568,011 | B2 | 7/2009 | Bocking et al. | |
| 2002/0177456 | A1 * | 11/2002 | Kimoto et al. | 455/466 |
| 2003/0064707 | A1 | 4/2003 | Yoneyama | |
| 2003/0177191 | A1 * | 9/2003 | Kawashima et al. | 709/206 |
| 2003/0234814 | A1 * | 12/2003 | Salminen et al. | 345/758 |
| 2006/0020677 | A1 * | 1/2006 | von Koch | 709/207 |
| 2006/0084462 | A1 * | 4/2006 | Panje | 455/550.1 |
| 2006/0270461 | A1 * | 11/2006 | Won et al. | 455/566 |

OTHER PUBLICATIONS

"Symbian Software for Series 60 smartphones:Symbian OS Applications and Games", http://my-communicatior.com/7650/applications/applications.php?flpAu..., published at least as early as Mar. 7, 2006.
"SmartPhoneToday", http://www.pdastreet.com/forums/showthread.php?threadid=54432, published at least as early as Mar. 7, 2006.
"Opera Community", http://my.opera.com/community/forums/topic.dml?id-119296, published at least as early as Mar. 7, 2006.
"Mobile MMS.com", http://www.mobilejargonbuster.com, published at least as early as Mar. 7, 2006.

* cited by examiner

Primary Examiner—Zarni Maung
(74) Attorney, Agent, or Firm—Ridout & Maybee LLP

(57) ABSTRACT

Based on user configuration, a main messaging user interface screen on a messaging device either presents a list of references to messages stored on the device based on a complete index of references to the stored messages or based on a filtered index of references to the stored messages. References to stored messages of a predetermined type are not maintained in the filtered index.

8 Claims, 7 Drawing Sheets

METHOD AND DEVICE FOR HIDING MESSAGES

FIELD OF THE INVENTION

The present invention relates to the operation of messaging client software and, in particular, to a method and device for actively limiting the presentation of references to a particular type of message in a main messaging user interface screen.

BACKGROUND

It is often the case for messaging clients, especially those messaging clients operating on wireless, hand-held communication devices, that a reference to each message, both sent and received, appears in a main messaging user interface screen.

Unfortunately, users may find that the aggregated display is cluttered and confusing. The users may wish to, in an attempt to reduce clutter, hide references to a particular type of message, say, sent messages, so that the number of displayed references to messages is reduced. However, to this point, an efficient solution for hiding references to sent, or other, messages has not been found.

BRIEF DESCRIPTION OF THE DRAWINGS

In the figures which illustrate example embodiments of this application.

DETAILED DESCRIPTION

Figure 1:
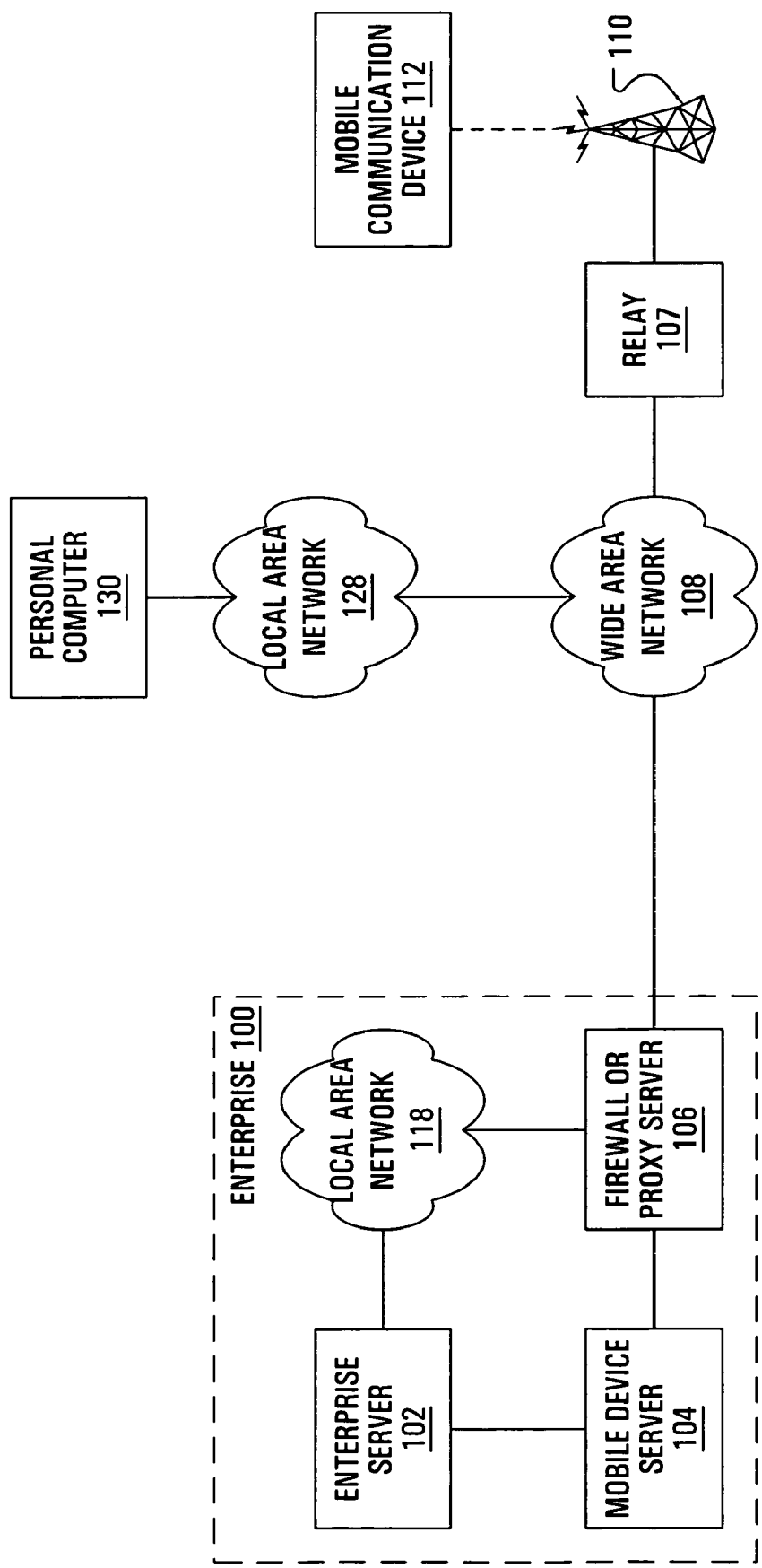
FIG. 1 illustrates an exemplary communication network including an enterprise with a wireless connection to a mobile data communication device.

Based on user configuration, a main messaging user interface screen on a messaging device either presents a list of references to messages stored on the device based on a complete index of references to the stored messages or based on a filtered index of references to the stored messages. References to stored messages of a predetermined type are not maintained in the filtered index. For example, a user may provide an indication that display of references to sent messages is to be limited. Responsive to receiving such an indication, a filtered index may be created, where the filtered index of references excludes sent messages. Later, when the main messaging user interface screen is requested by the user, a display list may be formed, based on the filtered index.

In accordance with an aspect of the present application there is provided a method of presenting a display on a mobile communication device. The method includes storing a plurality of received messages and a plurality of sent messages. The method further includes, in a first mode, presenting a first display that includes references to the plurality of received messages and references to the plurality of sent messages and, in a second mode, presenting a second display that includes references to only the plurality of received messages. Additionally, a mobile communication device is provided for carrying out this method and a computer readable medium is provided for containing instructions to allow a processor to carry out this method.

In accordance with another aspect of the present application there is provided a method of presenting a user interface on a communication device on which are stored a plurality of messages. The method includes receiving a request to present a display list of references to the plurality of messages, determining whether a configuration option has been activated to limit presentation of references to a particular type of message, if the configuration option has been activated, forming the display list of references based on a filtered index of references to the plurality of messages and controlling presentation of the display list. Additionally, a mobile communication device is provided for carrying out this method and a computer readable medium is provided for containing instructions to allow a processor to carry out this method.

In accordance with a further aspect of the present application there is provided a method of presenting a user interface on a communication device on which device are stored a plurality of messages. The method includes maintaining a master index of references to a plurality of message objects, receiving an indication of a filtering criterion, creating, based on the master index, a filtered index of references to a plurality of message objects that satisfy the filtering criterion, forming a display list based on the filtered index and presenting the display list. The creating the filtered index includes selecting a given reference from the master index, determining whether a given message object corresponding to the given reference satisfies the filtering criterion and if the given message object satisfies the filtering criterion, adding the given reference to the filtered index. Additionally, a mobile communication device is provided for carrying out this method and a computer readable medium is provided for containing instructions to allow a processor to carry out this method.

In accordance with a still further aspect of the present application there is provided a method of maintaining a filtered index of references to a plurality of messages objects. The method includes receiving a notification event message relating to a given message object, determining whether a reference to the given message object is present in the filtered index, if a reference to the given message object is not present in the filtered index, determining whether the given message object satisfies a criterion and, if the given message object satisfies the criterion, adding a reference to the given message object to the filtered index.

Other aspects and features of the present application will become apparent to those of ordinary skill in the art upon review of the following description of specific embodiments of the application in conjunction with the accompanying figures.

As illustrated in FIG. 1, an enterprise 100 includes a local area network (LAN) 118 connected to a central enterprise server 102. The enterprise server 102, which may, for instance, be a Microsoft™ Exchange Server, may provide access to electronic mail (e-mail) services, calendar services and contact management services. The enterprise server 102 is connected to a wide area network (WAN, such as the public Internet) 108 via a firewall or proxy server 106. The enterprise 100 may take advantage of centralized management services for wireless communications by installing a mobile device server 104 with a connection via the firewall 106 to the WAN 108. As illustrated in FIG. 1, a wireless carrier network 110 connects to the WAN 108 via a relay 107. An exemplary mobile communications device 112 may be connected to the wireless carrier network 110 for accessing the services provided by the enterprise server 102 through communication with the mobile device server 104.

Elsewhere, a further LAN 128, to which is connected a personal computer 130, is connected to the WAN 108.

In typical operation, a user of the mobile communication device 112 may compose an e-mail message addressed to a user of the personal computer 130. Upon completion of the composition of the e-mail message, the user of the mobile communication device 112 may select a "Send" menu item from a menu presented by an e-mail message composition user interface. Responsive to the menu item selection, the mobile communication device 112 may send the e-mail message to the enterprise server 102 via the wireless carrier network 110, the relay 107, the WAN 108, the firewall 106 and the mobile device server 104. In addition to sending the message, the mobile communication device 112 stores a copy of the composed message in local memory.

At the enterprise server 102, the appropriate steps may be taken to send the e-mail message, through the LAN 118, the firewall 106 and the WAN 108, to a mail server (not shown) at the further LAN 128 that is associated with the "TO:" address of the e-mail message. Subsequently, the user of the personal computer 130 may request that an e-mail client executed on the personal computer 130 request e-mail messages for that user from the mail server at the further LAN 128.

Other messaging formats may be available to the user of the mobile communication device 112. For one example, the user of the mobile communication device 112 may send a message to a user of another mobile communication device using the known Short Messaging Service (SMS). For another example, the user of the mobile communication device 112 may send a message to a user of another mobile communication device using the known Multimedia Messaging Service (MMS). MMS is based on the same principle as conventional SMS. When using SMS-based messaging, messages may be restricted to a maximum size, which may be expressed as 160 text characters or 160 bytes. In contrast, the MMS-based messaging standard does not specify a maximum size. A maximum size may be specified by an operator of a wireless communication network or by a manufacturer of a particular mobile communication device (for billing purposes). Using MMS-based messaging, different types of data, such as text, music, photographs or brief video sequences, may be included in a single message.

In a manner similar to sending a message using an e-mail service, in conjunction with arranging the transmission of an SMS message or an MMS message, the mobile communication device 112 stores a copy of the composed message.

As should be clear to persons of ordinary skill in the art of wireless messaging, the mobile communication device 112 that can send messages of various types can equally receive messages of various types, including e-mail messages, SMS messages and MMS messages. Further types of messages may be available for sending and receiving, the protocol of the exchange of these further types of messages being proprietary to particular manufacturers of devices or developers of mobile communication device software.

If the mobile communication device operating software is implemented in an object-oriented programming language, each of the messages, whatever type, sent and received, may be considered a separate object. In particular, each of the messages may be considered an instantiation of a message class. More particularly, a sent e-mail message may be an instantiation of a Sent E-mail Message class, a received e-mail message may be an instantiation of a Received E-mail Message class, a sent SMS message may be an instantiation of a Sent SMS Message class, etc. Each message class may have a structure unique to the type of message represented, including appropriate methods and implementing appropriate interfaces.

The main user interface of the messaging client executed on the mobile communication device 112 may provide a user with an ability to associate a given message object with a particular folder. As such, the message objects maintained by the messaging client may be associated with a status of either "filed", for those message that have been filed in a particular folder, or "un-filed", for those messages that have not been filed.

Figure 2:
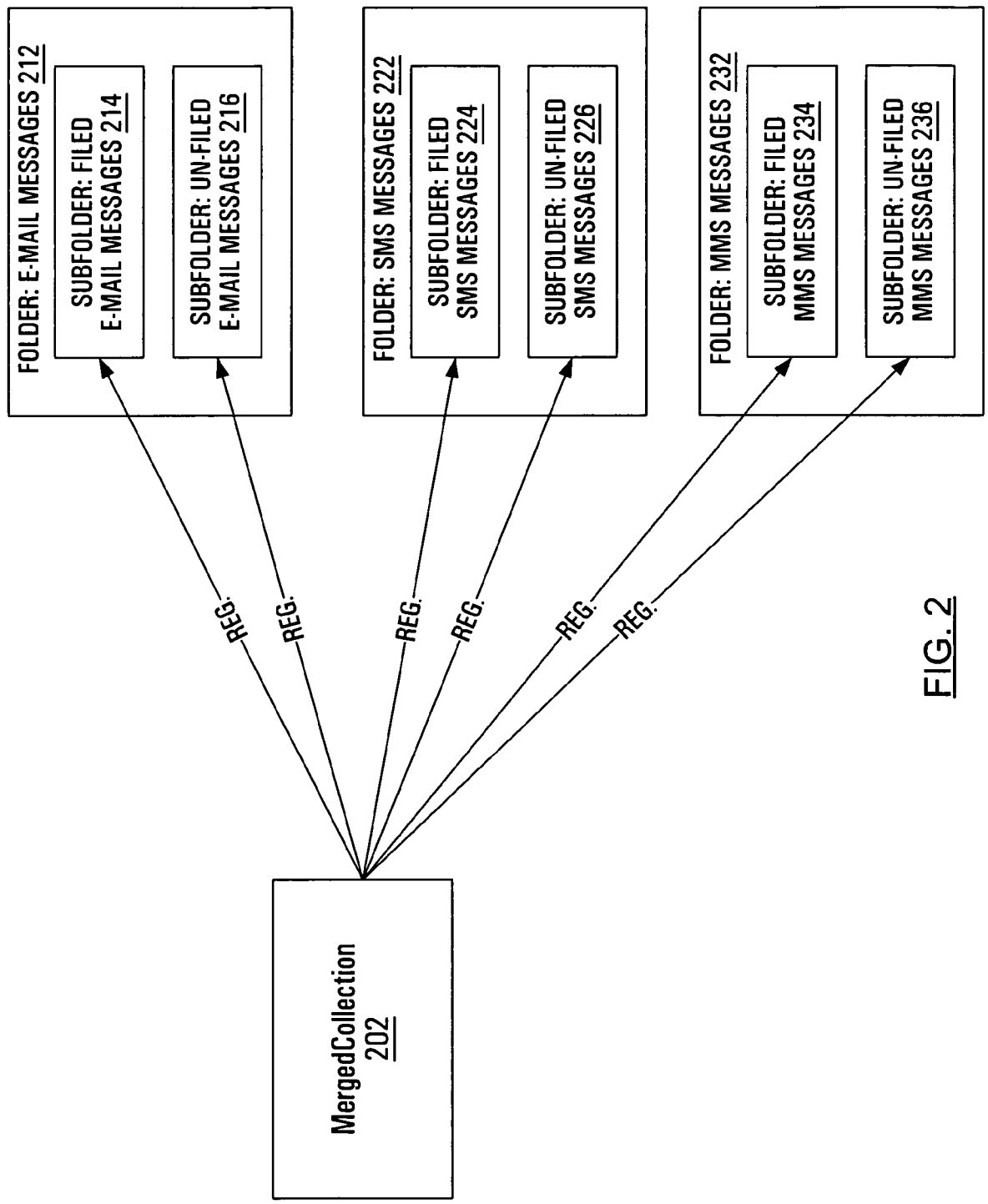
FIG. 2 illustrates a relationship between folders maintaining indices of references to specific types of messages and an aggregating object for maintaining a complete index.

Without regard for whether the user has associated a message object with a folder for organization of the message objects, each message object is associated with one or more folders. For example, as illustrated in FIG. 2, a reference to each e-mail message object (both sent and received) stored on the mobile communication device 112 is maintained in a folder 212 specifically for references to e-mail messages, with a subfolder 214 for references to filed e-mail messages and a subfolder 216 for references to un-filed e-mail messages. Additionally, a reference to each SMS message object (both sent and received) stored on the mobile communication device 112 is maintained in a folder 222 for references to SMS messages, with a subfolder 224 for references to filed SMS messages and a subfolder 226 for references to un-filed SMS messages. Furthermore, a reference to each MMS message object (both sent and received) stored on the mobile communication device 112 is maintained in a folder 232 for references to MMS messages, with a subfolder 234 for references to filed MMS messages and a subfolder 236 for references to un-filed SMS messages.

Notably, stored received messages may not be complete. Indeed, as a memory preservation strategy, while a complete received message may be stored at the enterprise server 102 (see FIG. 1), only a portion of the received message may be stored at the mobile communication device 112.

In some mobile communications devices, a main messaging user interface is provided for messaging using all of the messaging types available to the device. As such, a main messaging user interface screen object may control a display of references to e-mail messages sent and received, SMS messages sent and received, MMS messages sent and received and other types of messages sent and received.

A message aggregating object may be designed for maintaining an aggregate, or "master", index of references to messages sent and received at the mobile communication device 112. As illustrated in FIG. 2, an instance 202 of a MergedCollection class may serve as the message aggregating object.

Upon creation, the MergedCollection object 202 registers, as a "listener", with the filed e-mail messages subfolder 214, the un-filed e-mail messages subfolder 216, the filed SMS messages subfolder 224, the un-filed SMS messages subfolder 226, the filed MMS messages subfolder 234 and the un-filed SMS messages subfolder 236. Responsive to the registration of the MergedCollection object 202, each subfolder provides the MergedCollection object 202 with an index of the references to messages contained in the subfolder. The MergedCollection object 202 aggregates the received indices into a master index of references to message objects.

Once the MergedCollection object 202 has registered as a listener to a given subfolder, each time the contents of the given subfolder changes, due to, for example, additions, deletions and modifications of a reference to a message object, the given subfolder sends a notification event message to all listeners. Consequently, the given subfolder sends a notification event message to the MergedCollection object 202. Responsive to receiving the notification event message, the MergedCollection object 202 updates the master index of references to message objects.

Figure 3:
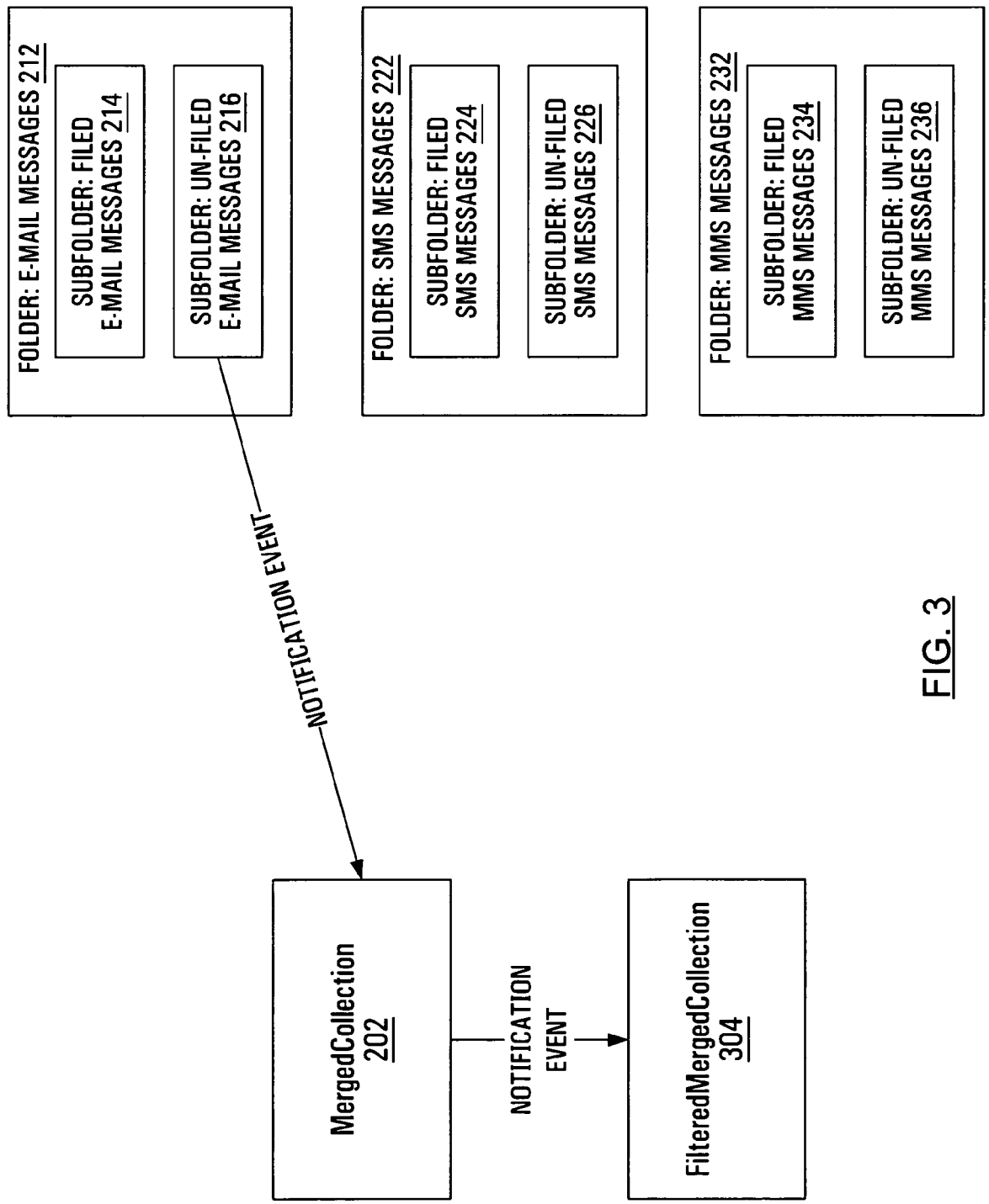
FIG. 3 illustrates the addition of an object for maintaining a filtered index in conjunction with messaging flow according to an embodiment of the present application.

A new class of object, a FilteredMergedCollection class, is proposed herein, similar to the MergedCollection class. An object 304 (see FIG. 3) of the FilteredMergedCollection class differs from the object 202 of the MergedCollection class in that the FilteredMergedCollection class is associated with filtering criteria. A reference to a message object is only included in a "filtered" index maintained by the FilteredMergedCollection object 304 if the message object satisfies the filtering criteria. Furthermore, rather than registering with the subfolders, as done by the MergedCollection object 202, the FilteredMergedCollection object 304 registers as a listener with the MergedCollection object 202 and, consequently, receives references to message objects, and subsequent notification event messages, from the MergedCollection object 202.

Figure 4:
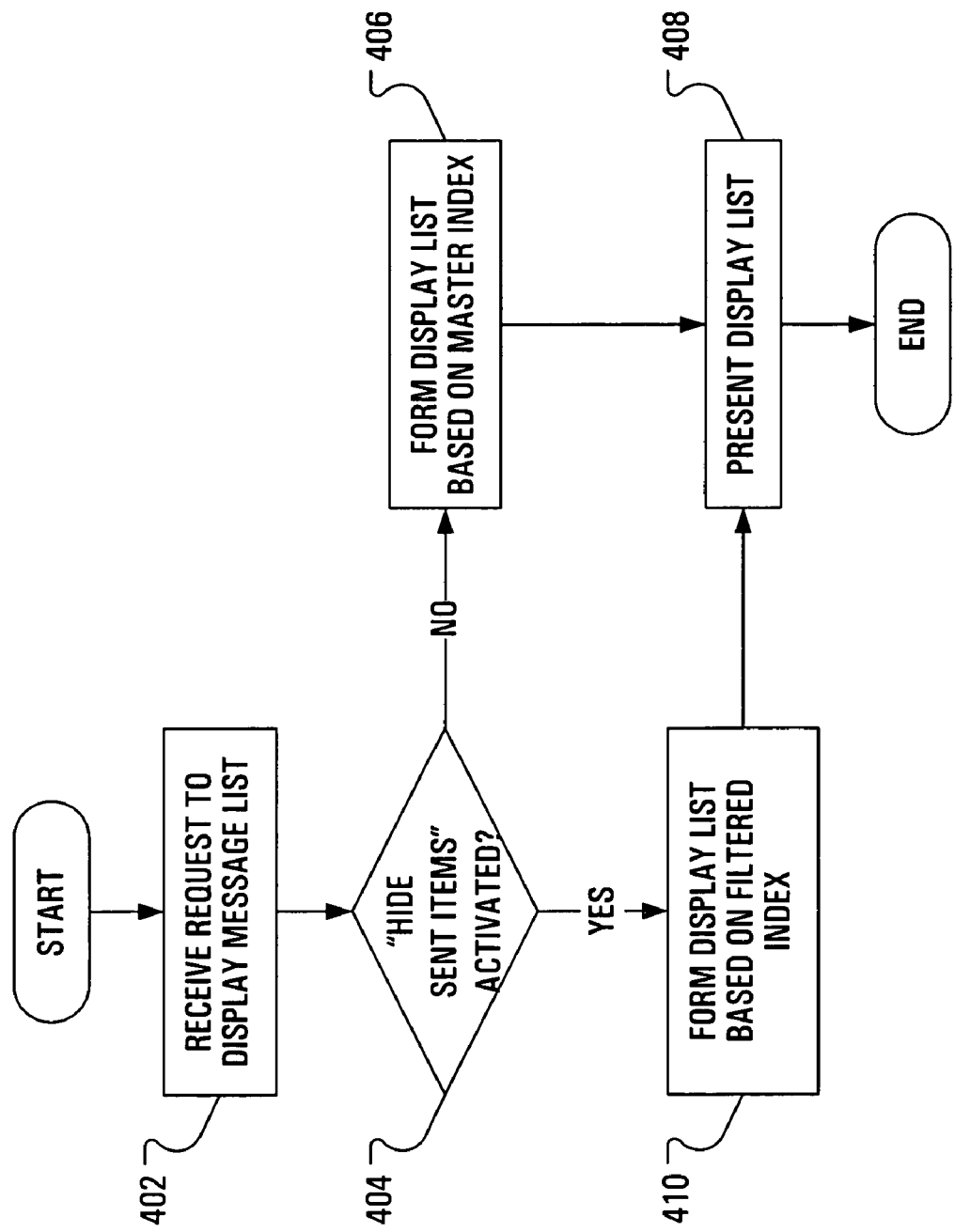
FIG. 4 illustrates exemplary steps in a method of presenting a display list of references to stored messages, according to an embodiment of the present application.

In overview, in common with typical operation, the main messaging user interface screen object receives a request (step 402, FIG. 4), from the user, to display a list of references to message objects. The main messaging user interface screen object then determines (step 404) whether the user has configured the software to activate limiting the display of (hide) references to a particular type of message, say, sent messages. If it is determined that the user has not configured the software to hide sent messages, the main messaging user interface screen object forms a Display List (step 406) of references to message objects based on the master index that is maintained by the MergedCollection object 202. The main messaging user interface screen object may then control the presentation of the Display List (step 408) on a user interface screen of the mobile communication device 112. If it is determined (step 404) that the user has configured the software to hide sent messages, the main messaging user interface screen object forms a Display List (step 410) of references to message objects based on the filtered index that is maintained by the FilteredMergedCollection object 304. The main messaging user interface screen object may then control the presentation of the Display List (step 408) on the user interface screen of the mobile communication device 112.

In a first exemplary message composition scenario, wherein a user has not indicated that the display of any type of message should be suppressed (e.g., a configuration option "Hide Sent messages" has been set to "No"), the user composes an e-mail message. Briefly, software executed on the mobile communication device 112 receives an indication of a selection, by the user, of a "new e-mail message" menu item from a messaging user interface menu. Responsively, the executing software instantiates an object of a new e-mail message class. Based on user input, the executing software populates fields of the new e-mail message object. The executing software then receives an indication of a selection, by the user, of a "send" menu item from the messaging user interface menu. In conjunction with arranging the transmission of the new e-mail message over the wireless network 110, which may involve adding the new e-mail message object to an outgoing message queue, the executing software may store the new e-mail message object and add a reference to the new e-mail message object to the un-filed e-mail messages subfolder 216 (see FIG. 2).

When the reference to the new e-mail message object is added to the un-filed e-mail messages subfolder 216, the un-filed e-mail messages subfolder 216 sends a notification event message to each registered listener (e.g., the MergedCollection object 202), indicating that the reference to the new e-mail message object has been added. Upon receiving the notification event message, the MergedCollection object 202 updates the maintained master index to include the reference to the new e-mail message object.

Unfortunately, users may find that a display of the master index, which aggregates references to messages in the e-mail format, SMS format, MMS format, etc., both sent and received, is cluttered and confusing. The users may, in an attempt to reduce clutter, wish to hide sent messages so that only received messages are displayed. To that end, the user may navigate within the user interface screens of the mobile communication device to a configuration screen. The user may use the configuration screen to indicate that sent messages are not to be included in the display presented by the main messaging user interface screen object. The selection of this configuration option triggers instantiation of the FilteredMergedCollection class such that the FilteredMergedCollection object 304 is created. Notably, until the user has indicated a requirement to hide particular types of messages, the FilteredMergedCollection object 304 is unnecessary.

Figure 5:
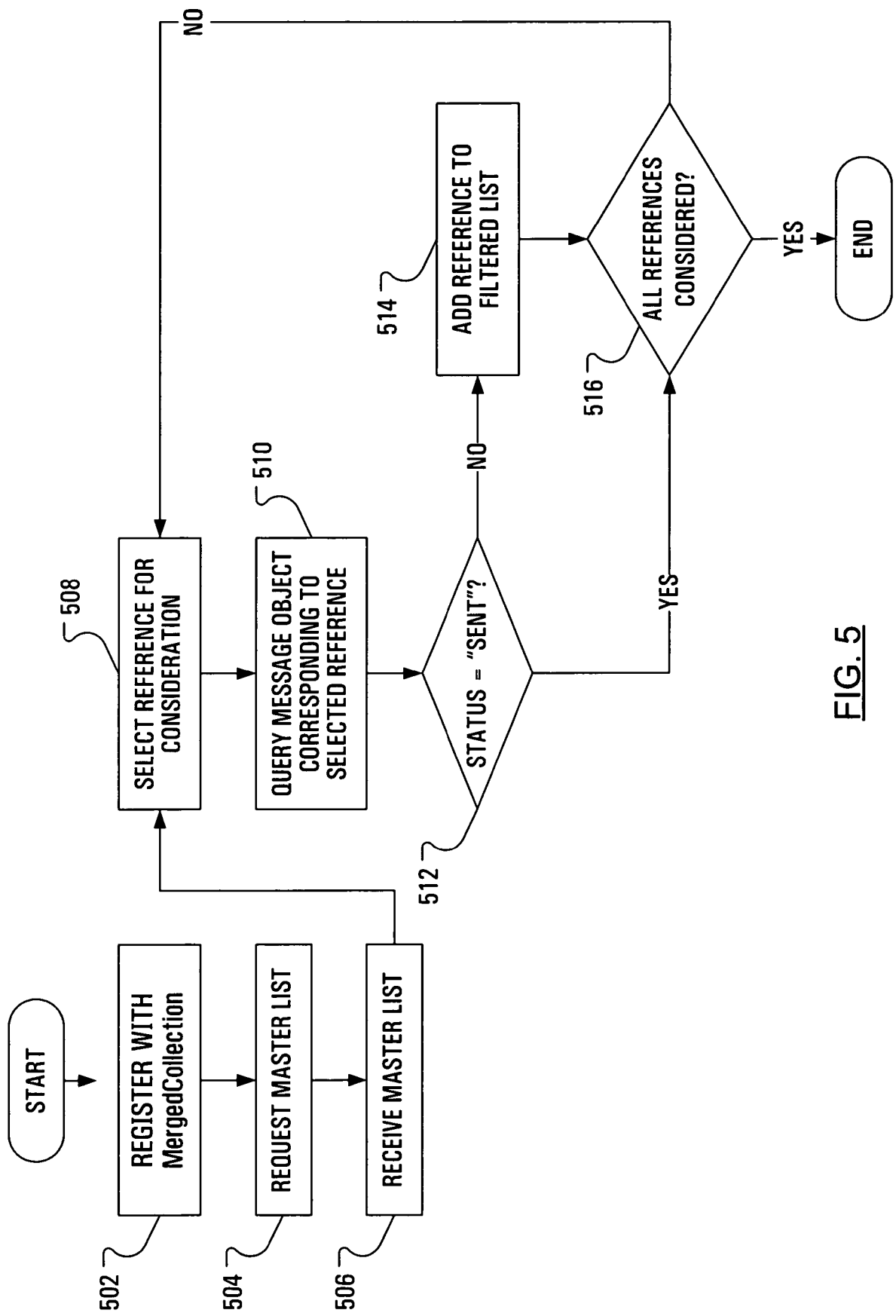
FIG. 5 illustrates exemplary steps in a method of initializing the filtered index, according to an embodiment of the present application.

Once created, the FilteredMergedCollection object 304 enters a startup phase, exemplary steps of which are illustrated in FIG. 5. The startup phase involves registering (step 502), as a listener, with the MergedCollection object 202. Furthermore, the FilteredMergedCollection object 304 requests (step 504), from the MergedCollection object 202, the master index currently maintained by the MergedCollection object 202.

When the FilteredMergedCollection object 304 has received (step 506) the master index, the FilteredMergedCollection object 304 considers each of the references in the master index as candidates for the filtered index. In particular, the FilteredMergedCollection object 304 first selects a reference (step 508) for consideration. Then, the FilteredMergedCollection object 304 sends a status query (step 510) to the message object corresponding to the selected reference. Where the corresponding message object implements a predetermined visibility control interface, the corresponding message object responds to the status query with a communication that indicates various details about the corresponding message object. The communication may, for instance, take the form of a 16-bit value, where each of the 16 bits is representative of a status of the corresponding message object. The status bits may, for instance, be used to indicate that the corresponding message object is a "sent" message, a "received" message, a message "pending" in an outgoing message queue or a message in the process of "being transmitted".

Where the FilteredMergedCollection object 304 determines (step 510) that one of the details included in the communication from the corresponding message object indicates that the corresponding message object is a "sent" message, the FilteredMergedCollection object 304 does not add the reference to the corresponding message object to the maintained filtered index. The FilteredMergedCollection object 304 then determines (step 516) whether all references in the received master index have been considered. If all references in the received master index have been considered, the startup phase is complete. However, if all references in the received master index have been not considered, the FilteredMergedCollection object 304 selects another reference (step 508) for consideration.

Where the FilteredMergedCollection object 304 determines (step 510) that the communication from the corresponding message object indicates that the corresponding message object is a message of a type other than "sent", the FilteredMergedCollection object 304 adds (step 514) the reference to the corresponding message object to the maintained filtered index. The FilteredMergedCollection object 304 then determines (step 516) whether all references in the received master index have been considered. If all references in the received master index have been considered, the startup phase is complete.

In a second exemplary message composition scenario, wherein a user has indicated that the display of sent messages should be suppressed (e.g., the configuration option "Hide Sent messages" has been set to "Yes"), the user composes an e-mail message. As above, software executed on the mobile communication device 112 receives an indication of a selection, by the user, of a "new e-mail message" menu item from a messaging user interface menu. Responsively, the executing software instantiates an object of the new e-mail message class. Based on user input, the executing software populates fields of the new e-mail message object. The executing software then receives an indication of a selection, by the user, of a "send" menu item from the messaging user interface menu. In conjunction with arranging the transmission of the new e-mail message over the wireless network 110, which may involve adding the new e-mail message object to an outgoing message queue, the executing software then stores the new e-mail message object and adds a reference to the new e-mail message object to the un-filed e-mail messages subfolder 216.

When the reference to the new e-mail message object has been added to the un-filed e-mail messages subfolder 216, the un-filed e-mail messages subfolder 216 sends a notification event message to the MergedCollection object 202, indicating that the reference to the new e-mail message object has been added. Upon receiving the notification event message, the MergedCollection object 202 updates the maintained master index. The MergedCollection object 202 then sends a notification event message to each of its registered listeners (e.g., the FilteredMergedCollection object 304).

Figure 6:
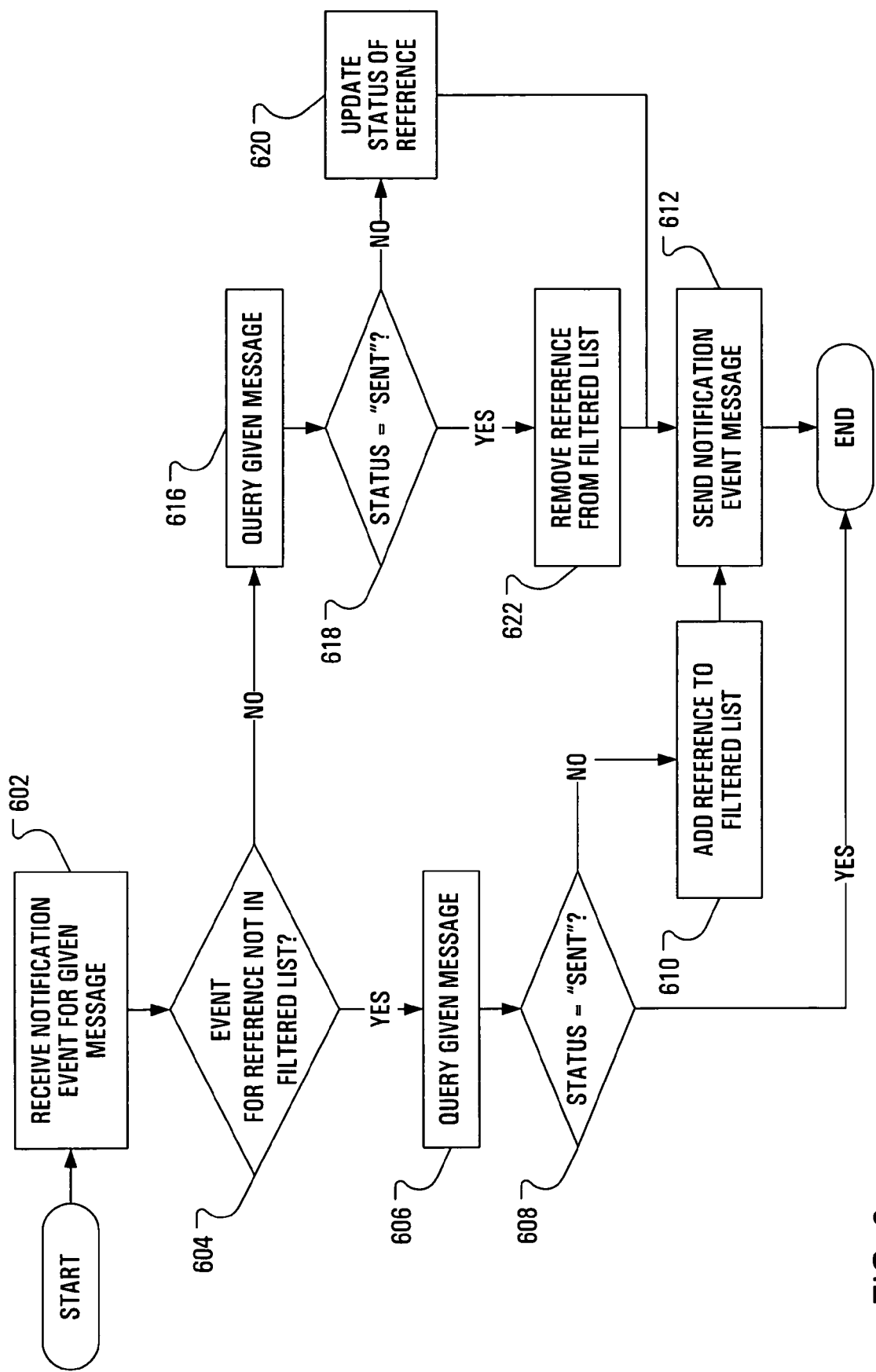
FIG. 6 illustrates exemplary steps in a method of maintaining the filtered index in the presence of notification event messages according to an embodiment of the present application.

Upon receiving the notification event message (step 602, see FIG. 6), the FilteredMergedCollection 304 determines (step 604) whether the notification event message relates to a message a reference to which is maintained in the filtered index. If the FilteredMergedCollection object 304 determines that the notification event message relates to a message a reference to which is not maintained in the filtered index, the FilteredMergedCollection 304 sends a status query (step 606) to the new e-mail message object. Where the new e-mail message object implements the predetermined visibility control interface, the new e-mail message object responds to the status query with a communication that indicates various details about the new e-mail message object. Where the FilteredMergedCollection 304 determines (step 608) that one of the details included in the communication from the new e-mail message object indicates that the new e-mail message object is a "sent" message, the FilteredMergedCollection object 304 does not add the reference to the new e-mail message object to the maintained filtered index and the method of processing a received notification event message is complete.

If, however, the FilteredMergedCollection 304 determines (step 608) that one of the details included in the communication from the new e-mail message object indicates that the new e-mail message object is, for example, a "pending" message or a "being transmitted" message, the FilteredMergedCollection object 304 adds the reference (step 610) to the new e-mail message object to the maintained filtered index, since only "sent" messages are to be left out of the filtered index. The FilteredMergedCollection object 304 may then send a notification event message (step 612), to any of its listeners, indicating that the reference to the new e-mail message object has been added to the filtered index and the method of processing a received notification event message is complete.

Each time the status of the new e-mail message object changes, the un-filed e-mail messages subfolder 216 sends a notification event message to each registered listener (e.g., the MergedCollection object 202), where the notification event message indicates that the status of the new e-mail message object has changed. Upon receiving the notification event message and acting according to the contents of the notification event message, the MergedCollection object 202 sends a notification event message to the FilteredMergedCollection object 304.

Upon receiving (step 602) the notification event message, the FilteredMergedCollection object 304 determines (step 604) whether the notification event message relates to a message a reference to which is maintained in the filtered index. If the FilteredMergedCollection 304 determines that the notification event message relates to a message a reference to which is maintained in the filtered index, the FilteredMergedCollection 304 sends a status query (step 616) to the new e-mail message object. Where the FilteredMergedCollection 304 determines (step 618) that one of the details included in the communication from the new e-mail message object, received responsive to the status query and a reference to which has previously been added to the filtered index maintained by the FilteredMergedCollection object 304, indicates that the new e-mail message object is a "sent" message, the FilteredMergedCollection object 304 updates the filtered index to remove the reference (step 622) to the new e-mail message object. The FilteredMergedCollection object 304 may then send a notification event message (step 612), to any of its listeners, indicating that the reference to the new e-mail message object has been removed from the filtered index, at which point the method of processing a received notification event message is complete.

Where the FilteredMergedCollection 304 determines (step 618) that the communication from the new e-mail message object indicates that the new e-mail message object has a status other than "sent", the FilteredMergedCollection object 304 updates the filtered index (step 620) to provide an accurate status for the reference to the new e-mail message object. The FilteredMergedCollection object 304 may then send a notification event message (step 612), to any of its listeners, indicating that the reference to the new e-mail message object has changed, at which point the method of processing a received notification event message is complete.

The user may, at some later time, wish to revert to viewing sent messages along with received messages. To that end the user may navigate within the user interface screens of the mobile communication device to the configuration screen. The user may use the configuration screen to indicate that sent messages are to be included in the display presented by the main messaging user interface screen object. The selection of this configuration option triggers deletion of the FilteredMergedCollection object 304.

Figure 7:
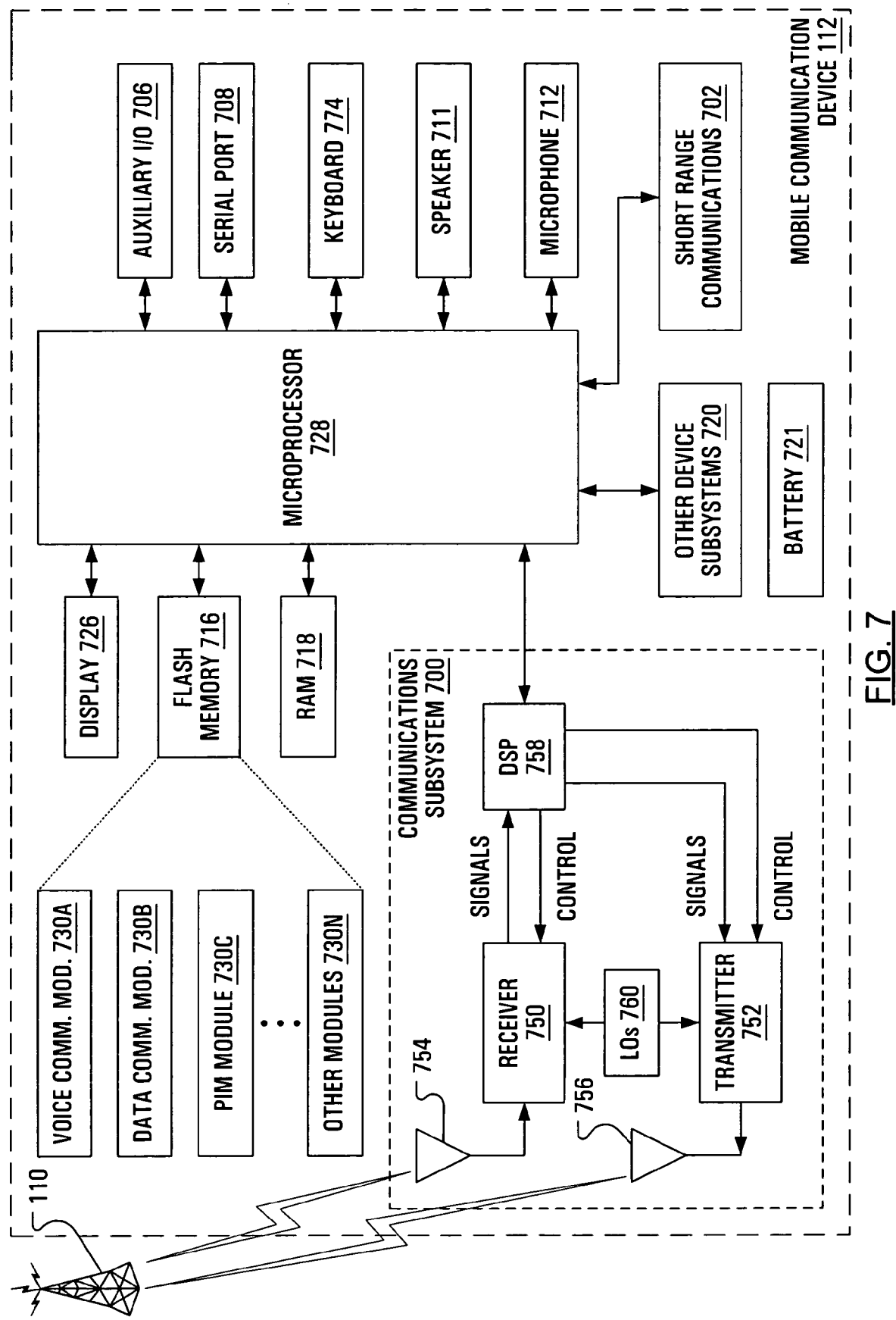
FIG. 7 illustrates a wireless mobile communication device from the exemplary communication network of FIG. 1, according to an embodiment of the present application.

FIG. 7 illustrates, in greater detail, the mobile communication device 112 familiar from FIG. 1. Aspects of the present application may be implemented in the mobile communication device 112.

FIG. 7 illustrates the mobile communication device 112 including a housing, an input device (a keyboard 774), and an output device (a display 726), which is preferably a full graphic Liquid Crystal Display (LCD). Other types of output devices may alternatively be utilized. A processing device (a microprocessor 728) is shown schematically in FIG. 7 as coupled between the keyboard 774 and the display 726. The microprocessor 728 controls the operation of the display 726, as well as the overall operation of the mobile device 112, in response to actuation of keys on the keyboard 774 by a user.

The housing may be elongated vertically, or may take on other sizes and shapes (including clamshell housing structures). The keyboard may include a mode selection key, or other hardware or software for switching between text entry and telephony entry.

In addition to the microprocessor 728, other parts of the mobile device 112 are shown schematically in FIG. 7. These include: a communications subsystem 700; a short-range communications subsystem 702; the keyboard 774 and the display 726, along with other input/output devices including a set of auxiliary I/O devices 706, a serial port 708, a speaker 711 and a microphone 712; as well as memory devices including a flash memory 716 and a Random Access Memory (RAM) 718; and various other device subsystems 720. The mobile device 112 may have a battery 721 to power the active elements of the mobile device 112. The mobile device 112 is preferably a two-way radio frequency (RF) communication device having voice and data communication capabilities. In addition, the mobile device 10 preferably has the capability to communicate with other computer systems via the Internet.

Operating system software executed by the microprocessor 728 is preferably stored in a persistent store, such as the flash memory 716, but may be stored in other types of memory devices, such as a read only memory (ROM) or a similar storage element. In addition, system software, specific device applications, or parts thereof, may be temporarily loaded into a volatile store, such as the RAM 718. Communication signals received by the mobile device may also be stored to the RAM 718.

The microprocessor 728, in addition to its operating system functions, enables execution of software applications on the mobile device 112. A predetermined set of software applications that control basic device operations, such as a voice communications module 730A and a data communications module 730B, may be installed on the mobile device 112 during manufacture. In addition, a personal information manager (PIM) application module 730C may also be installed on the mobile device 112 during manufacture. The PIM application is preferably capable of organizing and managing data items, such as calendar events, voice mails, appointments, and task items. A messaging application may be included, as part of the PIM application, for implementing aspects of the present application while organizing and managing e-mail messages, SMS messages, MMS messages and other messages. The PIM application is also preferably capable of sending and receiving data items via the wireless network 110. Preferably, the data items managed by the PIM application are seamlessly integrated, synchronized and updated via the wireless network 110 with the device user's corresponding data items stored or associated with a host computer system. As well, additional software modules, illustrated as an other software module 130N, may be installed during manufacture.

Communication functions, including data and voice communications, are performed through the communication subsystem 700, and possibly through the short-range communications subsystem 702. The communication subsystem 700 includes a receiver 750, a transmitter 752 and one or more antennas, illustrated as a receive antenna 754 and a transmit antenna 756. In addition, the communication subsystem 700 also includes a processing module, such as a digital signal processor (DSP) 758, and local oscillators (LOs) 760. The specific design and implementation of the communication subsystem 700 is dependent upon the communication network in which the mobile device 112 is intended to operate. For example, the communication subsystem 700 of the mobile device 112 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access CDMA, Personal Communications Service (PCS), Global System for Mobile Communications (GSM), etc. Other types of data and voice networks, both separate and integrated, may also be utilized with the mobile device 112.

Network access requirements vary depending upon the type of communication system. For example, in the Mobitex™ and DataTAC™ networks, mobile devices are registered on the network using a unique Personal Identification Number (PIN) associated with each device. In GPRS networks, however, network access is associated with a subscriber or user of a device. A GPRS device therefore requires a subscriber identity module, commonly referred to as a Subscriber Identity Module (SIM) card, in order to operate on a GPRS network.

When required network registration or activation procedures have been completed, the mobile device 712 may send and receive communication signals over the communication network 710. Signals received from the communication network 710 by the receive antenna 754 are routed to the receiver 750, which provides for signal amplification, frequency down conversion, filtering, channel selection, etc., and may also provide analog to digital conversion. Analog-to-digital conversion of the received signal allows the DSP 758 to perform more complex communication functions, such as demodulation and decoding. In a similar manner, signals to be transmitted to the network 110 are processed (e.g., modulated and encoded) by the DSP 758 and are then provided to the transmitter 752 for digital to analog conversion, frequency up conversion, filtering, amplification and transmission to the communication network 710 (or networks) via the transmit antenna 756.

In addition to processing communication signals, the DSP 758 provides for control of the receiver 750 and the transmitter 752. For example, gains applied to communication signals in the receiver 750 and the transmitter 752 may be adaptively controlled through automatic gain control algorithms implemented in the DSP 758.

In a data communication mode, a received signal, such as a text message or web page download, is processed by the communication subsystem 700 and is input to the microprocessor 728. The received signal is then further processed by the microprocessor 728 for an output to the display 726, or alternatively to some other auxiliary I/O devices 706. A device user may also compose data items, such as e-mail messages, using the keyboard 774 and/or some other auxiliary I/O device 706, such as a touchpad, a rocker switch, a thumb-wheel, or some other type of input device. The composed data items may then be transmitted over the communication network 110 via the communication subsystem 700.

In a voice communication mode, overall operation of the device is substantially similar to the data communication mode, except that received signals are output to a speaker 711, and signals for transmission are generated by a microphone 712. Alternative voice or audio I/O subsystems, such as a voice message recording subsystem, may also be implemented on the mobile communication device 112. In addition, the display 726 may also be utilized in voice communication mode, for example, to display the identity of a calling party, the duration of a voice call, or other voice call related information.

The short-range communications subsystem 702 enables communication between the mobile device 112 and other proximate systems or devices, which need not necessarily be similar devices. For example, the short-range communications subsystem may include an infrared device and associated circuits and components, or a Bluetooth™ communication module to provide for communication with similarly-enabled systems and devices.

In review, a user of the mobile communication device 112 may toggle between presenting, on the display 726, a Display List based on a master index of messages and presenting, on the display 726, a Display List based on a filtered index of messages. If the option to hide a particular type of message is activated, the Display List presented in the main messaging user interface screen is based on a filtered index of messages. As the filtered index is created and maintained, messages of the particular type are not maintained in the filtered index. If the option to hide a particular type of message is deactivated, the Display List presented in the main messaging user interface screen is based on a master index of messages, which master index includes references to all messages stored on the mobile communication device 112. Even when references to messages of a particular type are not presented in the main messaging user interface screen, the messages remain stored on the mobile communication device 112.

Furthermore, references to the messages of the particular type may be viewed as results of a search or when the contents of a given folder are presented. It is only the main messaging user interface screen wherein references to the messages of the particular type are excluded.

Notably, for the FilteredMergedCollection object 304 to successfully filter out a reference to a given message object, the given message object may be required to implement the predetermined visibility control interface. That is, if the FilteredMergedCollection object 304 cannot determine the status of a message object, the message object cannot be left out of the filtered index maintained by the FilteredMergedCollection object 304.

SMS messages may represent a special case. If the user chooses to do so, a series of SMS messages can be threaded into a single message object. The SMS message object representative of a particular thread of SMS messages may be considered a sent message if the most recent message in the thread is a sent message. Conversely, the SMS message object representative of the particular thread of SMS messages may be considered a received message if the most recent message in the thread is a received message. Given such ambiguity, it should be clear to persons of ordinary skill that a reference to the threaded SMS message object should not be hidden when an option to hide sent messages is activated. To avoid hiding references to threaded SMS message objects, a corresponding threaded SMS message class may be developed without implementing the visibility control interface. Alternatively, the corresponding threaded SMS message class may be developed to implement a visibility control interface that is preset not to provide a communication with the sent bit set to indicate a sent status.

Other modifications will be apparent to those skilled in the art and, therefore, the invention is defined in the claims.

We claim:

1. A method of presenting a display on a mobile communication device, said method comprising:
   storing a plurality of received messages and a plurality of sent messages;
   maintaining a master index that includes references to said plurality of received messages and references to said plurality of sent messages;
   in a first mode, presenting a first display that includes said references to said plurality of received messages and said references to said plurality of sent messages of said master index; and
   in a second mode, presenting a second display that includes references to only said plurality of received messages of said master index.

2. The method of claim 1 further comprising:
   receiving user input specifying that said mobile communication device is to operate in said second mode; and
   responsive to said receiving, creating, based on said master index, a filtered index of said references to only said plurality of received messages.

3. The method of claim 2 wherein said second display is based on said filtered index.

4. The method of claim 1 further comprising:
   receiving a request to display a list of references to message objects;
   determining that said mobile communication device is to operate in said second mode; and
   presenting said second display.

5. The method of claim 4 wherein said determining comprises determining that said list of references to message objects is be limited to a particular type of message object.

6. The method of claim 5 wherein said particular type of message object is a received message object.

7. A mobile communication device operable to:
   store a plurality of received messages and a plurality of sent messages;
   maintain a master index that includes references to said plurality of received messages and references to said plurality of sent messages;
   in a first mode, present a first display that includes said references to said plurality of received messages and said references to said plurality of sent messages of said master index; and
   in a second mode, present a second display that includes references to only said plurality of received messages of said master index.

8. A computer readable storage medium containing computer-executable instructions that, when performed by processor in a mobile communication device, cause said processor to:
   store a plurality of received messages and a plurality of sent messages;
   maintain a master index that includes references to said plurality of received messages and references to said plurality of sent messages;
   in a first mode, present a first display that includes said references to said plurality of received messages and said references to said plurality of sent messages of said master index; and
   in a second mode, present a second display that includes references to only said plurality of received messages of said master index.

* * * * *